United States Patent [19]

Gaul et al.

[11] Patent Number: 4,486,557
[45] Date of Patent: * Dec. 4, 1984

[54] ORGANIC POLYISOCYANATE-LIQUID AROMATIC EPOXIDE-LIGNIN ADHESIVE BINDER COMPOSITIONS

[75] Inventors: James M. Gaul, Exton, Pa.; Tinh Nguyen, Gaithersburg, Md.

[73] Assignee: Atlantic Richfield Company, Los Angeles, Calif.

[ * ] Notice: The portion of the term of this patent subsequent to Nov. 30, 1999 has been disclaimed.

[21] Appl. No.: 555,304

[22] Filed: Nov. 25, 1983

Related U.S. Application Data

[63] Continuation-in-part of Ser. No. 317,805, Nov. 11, 1981, abandoned.

[51] Int. Cl.$^3$ .................... C08L 63/00; C08L 97/00
[52] U.S. Cl. .................... 523/446; 264/109; 264/211; 264/319; 527/401; 528/73; 523/400

[58] Field of Search ............... 428/316, 402; 523/446, 523/400; 527/401; 528/73; 524/14, 702; 264/109, 211

[56] References Cited

U.S. PATENT DOCUMENTS

| | | | |
|---|---|---|---|
| 3,702,839 | 11/1972 | Glasgow et al. | 528/73 X |
| 3,984,376 | 10/1976 | Yokono et al. | 528/73 X |
| 4,066,628 | 1/1978 | Ashida et al. | 528/73 X |
| 4,070,416 | 1/1978 | Narahara et al. | 528/73 X |
| 4,359,507 | 11/1982 | Gaul et al. | 524/14 X |
| 4,361,662 | 11/1982 | Gaul et al. | 528/73 X |

*Primary Examiner*—Earl A. Nielsen
*Attorney, Agent, or Firm*—Delbert E. McCaslin

[57] ABSTRACT

An adhesive binder composition is provided for the preparation of lignocellulosic composite molded articles such as flake or particle board, made from moldable compositions which comprises an organic di- or polyisocyanate a liquid aromatic epoxide and lignin, for application to the lignocellulosic material prior to the molding process to form the composite product.

25 Claims, No Drawings

4,486,557

ORGANIC POLYISOCYANATE-LIQUID AROMATIC EPOXIDE-LIGNIN ADHESIVE BINDER COMPOSITIONS

CROSS REFERENCE TO RELATED APPLICATIONS

This application is a continuation-in-part application of co-pending application Ser. No. 317,805, filed Nov. 11, 1981 and now abandoned and entitled Organic Polyisocyanate-Liquid Aromatic Epoxide Adhesive Binder Compositions.

FIELD OF THE INVENTION

The present invention relates generally to the compression molding of lignocellulosic materials into composite bodies, sheets and the like and more particularly to an organic di- or polyisocyanate based binder system for the lignocellulosic material which imparts equivalent or improved properties to the molded pressed composite product at substantially reduced isocyanate binder levels.

BACKGROUND OF THE INVENTION

The molding of lignocellulosic and lignocellulosic containing fibers, particles or layers to form composite articles is known. The binders which normally are used are the synthetic resin glues such as a solution of urea-formaldehyde or phenol-formaldehyde resin in water. Composite products containing lignocellulose produced in this way lack durability and are susceptible to moisture conditions and deterioration in certain building purposes to which they may be subjected.

Di- and polyisocyanates as binders for lignocellulose materials have been proposed and are known to give products of increased stability and mechanical strength. Process technical advantages of polyisocyanates have been disclosed in German Offenlegungsschrift No. 2,109,686. One problem associated with the use of polyisocyanate binders is that the viscosity of the normally employed polyisocyanate binders are much higher than the synthetic glue resins and are therefore difficult to apply to the lignocellulose with current application equipment or methods. The advent of technology to emulsify the polyisocyanates in water provided a binder product with reduced viscosity but with a service life of only 2 to 4 hours.

The present invention which comprises an improved polyisocyanate based adhesive binder composition that has been extended through the addition of a liquid aromatic epoxide having one α epoxide group and/or aromatic or aliphatic based multifunctional epoxide having 2 or more epoxide groups, and lignin, avoids the above mentioned disadvantages.

SUMMARY OF THE INVENTION

This invention relates to the preparation of a polyisocyanate-liquid aromatic epoxide binder composition and its use for the preparation of lignocellulosic composite molded products.

It is the principal object of this invention to provide an improved lignocellulosic binder and composition which gives properties equivalent to or better than prior molded pressed composite products at dramatically reduced di- or poly-isocyanate (referred to generally as polyisocyanates) levels.

The advantages of the present invention is that the levels of the di- or poly-isocyanate necessary to produce a cured pressed composite lignocellulosic product can be substantially reduced while maintaining equivalent or superior composite board physical properties. By employing the di- or polyisocyanate-liquid aromatic epoxide combination, with the use of lignin as a diluent, compression molded products of superior strength and stability are obtained. The composite products made with the adhesive binders of the present invention have superior weathering properties to those prepared with the urea-formaldehyde or phenol-formaldehyde binder systems. The addition of the liquid aromatic epoxides to the di- or polyisocyanates provides a binder system with a marked increase in service life of up to thirty (30) days. The binder system of the present invention has viscosities equivalent to the formaldehyde type resin systems, which allows the instant binder system to be applied to the lignocellulosic chips, particles, etc., using present application technology. As a further advantage, the binder system of the present invention can be employed with high molecular weight solid or semi-solid di- or polyisocyanates such as 2,4' or 4,4'-diphenylmethane diisocyanates which by themselves would have properties which would preclude their use as adhesives for lignocellulosic products with current application techniques.

DESCRIPTION OF THE INVENTION

In accordance with the present invention an adhesive binder composition comprising a liquid aromatic epoxide having one α epoxide group and/or aromatic or aliphatic based multifunctional epoxide having 2 or more epoxide groups, and an organic di- or polyisocyanate, with the addition of lignin, is provided for the preparation of lignocellulosic composite bodies or sheets which comprises shaping in a mold or between mold surfaces in the form of a caul plate or platen a mixture of the lignocellulosic material and the isocyanate based binder of the present invention generally at temperatures of from about 140° C. to 220° C., preferably 160° C. to 190° C., at pressures of from about 100 to 600 psi for a period of from 1 to 10, preferably 3 to 5 minutes, there being provided at the interface of the mixture and mold surface or surfaces a release agent such as a metallic soap or siloxane.

The organic polyisocyanates are generally applicable as binders in the present invention. Organic polyisocyanates which may be used include aliphatic, alicyclic and aromatic polyisocyanates characterized by containing two or more isocyanate groups. Such polyisocyanates include the diisocyanates and higher functionality isocyanates, particularly the aromatic polyisocyanates. Mixtures of polyisocyanates may be used which for example are the crude mixtures of di- and higher functionality polyisocyanates produced by phosgenation of aniline-formaldehyde condensates or as prepared by the thermal decomposition of the corresponding carbamate dissolved in a suitable solvent as described in U.S. Pat. Nos. 3,962,302 and 3,919,279 both known as crude MDI or PMDI. The organic polyisocyanate may be isocyanate ended prepolymers made by reacting under standard known conditions, an excess of the polyisocyanate with a polyol which on a polyisocyanate to polyol basis may range from about 20:1 to 2:1 and include for example polyethylene glycol, polypropylene glycol, diethylene glycol monobutyl ether, ethylene glycol monoethyl ether, triethylene glcyol, etc. as well as glycols or polyglycols partially esterified with carboxylic acids including polyester polyols and polyether polyols. The organic polyisocyanates or isocyanate terminated prepolymer may also be used in the form of an aqueous emulsion by mixing such materials with water in the presence of an emulsifying agent. The isocyanates may also contain impurities or additives such as carbodiimides, isocyanurate groups, urea, hydrolyzable chlorides and blurets as well as certain release agents. Illustrative of such di- or polyisocyanates which may be employed include, for example, toluene-2,4- and 2,6-diisocyanates or mixtures thereof, diphenylmethane-4,4'-diisocyanate (a solid) and diphenylmethane-2,4'-diisocyanate (a solid) or mixtures of same, i.e., containing about 10 parts by weight 2,4'- or higher, which are liquid at room temperature, polymethylene polyphenyl isocyanates, naphthalene-1,5-diisocyanate, 3,3'-dimethyl diphenylmethane-4,4'-diisocyanate, triphenylmethane triisocyanate, hexamethylene diisocyanate, 3,3'ditolylene-4,4-diisocyanate, butylene, 1,4-diisocyanate, octylene-1,8-diisocyanate, 4-chloro-1,3-phenylene diisocyanate, 1,4- 1,3-, and 1,2-cyclohexylene diisocyanates and in general the polyisocyanates disclosed in U.S. Pat. No. 3,577,358. The preferred polyisocyanates are the diphenylmethane diisocyanate 2,4' and 4,4' isomers including the 2,2' isomer and the higher functional polyisocyanate and polymethylene polyphenyl isocyanate mixtures, which may contain from about 20 to 85 weight percent of a mixture of the diphenylmethane diisocyanate isomers. Typical of the preferred polyisocyanates are those sold commercially as "Rubinate-M" (Rubicon Chemicals, Inc.) and "Papi" (The Upjohn Co.). In general the organic polyisocyanates will have a molecular weight in the range between about 100 and 10,000 and will be employed in amounts of from about 20 to 95 parts by weight, preferably 50 to 75 parts by weight based on the polyisocyanate-liquid aromatic epoxide adhesive binder mixture.

The liquid aromatic epoxides having one α epoxide group and/or aromatic or aliphatic based multifunctional epoxides or mixtures thereof which may be employed in the present invention in amounts of from about 5 to 80 preferably 50 to 25 parts by weight based on the isocyanate-liquid aromatic epoxide binder mixture include, for example, epoxides having one or more α epoxide (1,2-epoxy) groups whether situated internally, terminally or on cyclic structures. Typical of the epoxides is styrene oxide as well as the epoxy-type resins sold commercially as "Epon" resins by the Shell Chemical Company and "Araldite" liquid epoxy resins by Ciba-Geigy both having a varying epoxy equivalent weight (grams of resin containing one gram-equivalent of epoxide).

The aromatic epoxides having one α epoxide group which may be employed in the present invention include styrene oxide, epoxidized 1-phenyl-2-butene, epoxidized phenyl allyl ether and epoxidized o-allyl phenol. The aromatic or aliphatic multifunctional epoxides having 2 or more epoxide groups include diglycidyl ether of Bisphenol A, glycidyl ethers of novolac (phenol-formaldehyde) resins, glycidyl ethers of mononuclear di- and trihydric phenols, glycidyl ethers of aliphatic polyols such as glycerol, epoxidized phenolphthalein, glycidyl amines, epoxidized polybutadiene, vinylcyclohexene dioxide, butyl glycidyl ether, 1,4-butanediol diglycidyl ether and 3,4-epoxycyclohexylmethyl-3,4-epoxycyclohexane carboxylate. Structures typical of epoxides which may be employed are for example:

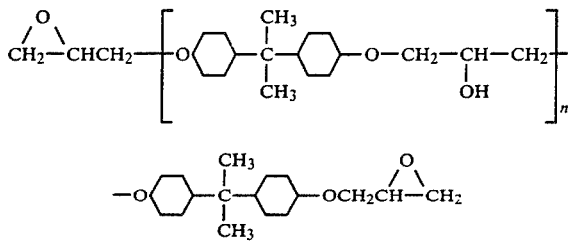

n = an integer giving various molecular weight resins. Typical molecule of an "EPON" resin of the Shell Chemical Company, or

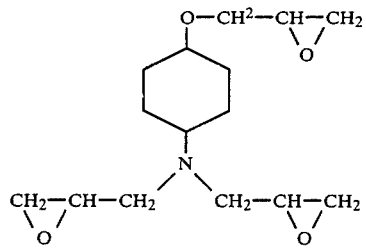

The epoxy resins (aromatic epoxides) may also be employed in a solvent solution such as xylene, methyl ethyl ketone, toluene and methyl isobutyl ketone. In general the liquid epoxy resin compounds described in the Handbook of Epoxy Resins, by Lee and Neville, 1967, McGraw-Hill, Inc. may be used in the present invention to prepare the isocyanate based lignocellulosic adhesive binder.

The lignin which is employed as a diluent in the binder system of the present invention may be used in amounts of from 1.0 to 60 weight percent, preferably from 10 to 35 and more preferably from 10 to 20 weight percent based on the total polyisocyanate-aromatic epoxide-lignin mixture. The exact composition of lignin varies. Lignin derived from a variety of sources may be used in the binder system of the present invention to form the adhesive mixture. One source is a mixture of waste liquors resulting from the chemical pulping of lignocellulose. Suitable lignin which may be employed include, for example, purified pine wood lignin, kraft waste liquor, soda waste liquor, calcium, magnesium, sodium and ammonium base sulfite liquors, chlorinated waste liquors, etc. Lignins from hardwood and softwood sources may be used as well as lignins from acid-precipitated and alkali reconstituted kraft liquors. The abundant and available chlorinated waste liquors derived from paper mill bleach may be used. The waste liquors may be used in their original conditions in the adhesive binder composition of the instant invention. The lignin may also have a wide range of pH and a solids content of from about 10 to 90 weight percent. The lignin employed may be simply physically mixed with the isocyanatearomatic epoxide adhesive when prepared or applied directly to the lignocellulosic material.

Lignocellulose, according to the present invention used to prepare the lignocellulosic-containing composite articles include wood chips, wood fibers, shavings, sawdust, wood wool, cork, bark and the like products from the wood-working industry. Fibers, particles, etc. from other natural products which are lignocellulosic such as straw, flax residues, dried weeds and grasses, nut shells, hulls from cereal crops such as rice and oats and the lke may be used. In addition, the lignocellulosic materials may be mixed with inorganic flakes or fibrous material such as glass fibers or wool, mica and asbestos as well as with rubber and plastic materials in particulate form. The lignocellulose may contain a moisture (water) contnt of up to about 25 percent by weight but preferably contains between 4 and 12 percent by weight.

The isocyanate-epoxide-lignin binding agent will generally be used alone but may also be in admixture with other materials such as alkylene carbonates or alkylene oxides.

In manufacturing lignocellulosic composite products for the purpose of this invention, such as flakeboard for example, a small amount of the adhesive binder along with the lignocellulosic material is simply milled or mixed uniformly together. Generally a mixture of the isocyanatearomatic epoxide-lignin binding agent is sprayed onto the lignocellulosic material while it is being mixed or agitated in suitable and conventional equipment. Methods of applying a mixture of the adhesive binder may vary, e.g., the isocyanate or aromatic epoxide may be sprayed separately one before the other or by separate streams simultaneously. Various type mixing equipment such as an intensive-shear mixer or tumbler may be employed. The binder use levels according to the present invention, based on the weight of oven dried (0% moisture content) lignocellulosic material is from about 1.5 to 12 preferably 2.5 to 6.5 weight percent. The lignocellulose-adhesive binder mixture is generally sprinkled or formed in the desired proportions onto a caul plate of aluminum or steel which serves to carry the "cake" into the press to give the desired thickness of product, the plates having been sprayed or coated with a release agent such as the metal soaps like the iron, calcium or zinc stearate compounds. Other conventional release agents such as sodium phenolate and certain tertiary amines may also be employed.

The following examples are provided to illustrate the invention in accordance with the principles of this invention but are not to be construed as limiting the invention in any way except as indicated by the appended claims.

In the Examples which follow, the test results set forth are expressed as ASTM D 1037 values and wherein

| | |
|---|---|
| I.B. | is Internal Bond (psi) |
| T.S. | is cold water (25° C.) thickness swell, 24 hr. immersion (%) |
| PMDI | is a mixture of liquid diphenyl-methane diisocyanate-polymethylene polyphenyl isocyanate having a 46.5% diphenyl-methane diisocyanate content |
| SO | is styrene oxide |
| "Araldite CY179" | is Ciba-Geigy 3,4-epoxycyclohexyl-methyl-3,4-epoxycyclohexane carboxylate |
| "Epoxy 0500" | is a Ciba-Geigy multifunctional epoxy resin obtained by reacting paraaminophenol with epichlorohydrin and having the N containing theoretical structure above noted and having an epoxy equivalent weight of 110 and a viscosity of 3000 @ 25° C. centipoise (cp) |
| "Epon 828" | is a liquid diglycidyl ether of Bisphenol A resin having an epoxide equivalent weight of 185–192 and a viscosity of 10,000 cp at 25° C. |

EXAMPLE 1

580 g. of pine wood chips dried to a moisture content of 6 percent are placed in an open tumbler-mixer. During tumbling, 3.2 parts based on 100 parts by weight of the wood of an isocyanate based binding agent prepared by mixing 78 parts crude liquid diphenylmethane diisocyanate-polymethylene polyphenyl isocyanate (PMDI) mixture having 46.5 percent diphenylmethane diisocyanate content and 22 parts styrene oxide are sprayed over the chips by an air pressurized system. Two caul plates 12 inches square are sprayed evenly with a zinc stearate external release agent. Using a former box, a 10.5 inch square "cake" of the chip-binder mixture is formed on the caul plate. The second caul plate is placed over the cake which is pressed to stops at a thickness of 13 mm at 190° C. for 4½ minutes after which the pressed cake is released from between the press plates and cut into specimens for physical testing. Test results of the composite board is 136 psi I.B. and a T.S. of 20.5 percent.

EXAMPLE 2

The procedure of Example 1 is repeated employing 58 parts crude PMDI and 42 parts styrene oxide and spraying 3.4 parts adhesive mix based on 100 parts by weight of the wood. Test results gave 106 I.B. and a T.S. of 25.

EXAMPLES 3 to 7

The procedure of Example 1 is repeated except that "Araldite CY179" at various ratios is mixed with crude liquid diphenylmethane diisocyanate-polymethylene polyphenyl isocyanate (PMDI) mixture having 46.5 percent diphenylmethane diisocyanate content while maintaining the total binder level constant at 3.5 percent based on 100 parts by weight of the wood. Comparative Example 7 is 100 percent PMDI. Results are set forth in Table 1.

TABLE 1

| Ex. No. | PMDI (%) | "Araldite CY179" (%) | I.B. (psi) | T.S. (%) |
|---|---|---|---|---|
| 3 | 90 | 10 | 171 | 19.4 |
| 4 | 75 | 25 | 124 | 20.7 |
| 5 | 60 | 40 | 118 | 23.6 |
| 6 | 40 | 60 | 80 | 28.7 |
| 7 | 100 | 0 | 165 | 18.0 |

EXAMPLES 8 to 12

The procedure of Example 1 is repeated using a Ciba-Geigy Epoxy Resin 0500-isocyanate mixture. The total binder level was between 4.0 and 3.4 percent based on 100 parts by weight of the wood. A third component, lignin (22.2%), a product resulting from the chemical pulping of lignocellulose, is added to the binder mixture in Example 12. The liquid diphenylmethane diisocyanate-polymethylene polyphenyl isocyanate (PMDI) mixture having a 46.5 percent diphenylmethane diisocyanate content and Epoxy Resin 0500 content varies over the range specified in Table 2 with test results indicated.

TABLE 2

| Ex. No. | PMDI (%) | Lignin (%) | Epoxy Resin 0500 (%) | Binder Level (Wt. %) | I.B. (psi) | T.S. (%) |
|---|---|---|---|---|---|---|
| 8 | 95.0 | 0.0 | 5.0 | 4.0 | 156 | 17.0 |
| 9 | 85.0 | 0.0 | 15.0 | 3.5 | 138 | 20.4 |
| 10 | 75.0 | 0.0 | 25.0 | 3.7 | 144 | 18.0 |
| 11 | 70.0 | 0.0 | 30.0 | 3.4 | 136 | 21.0 |
| 12 | 55.5 | 22.2 | 22.3 | 3.5 | 141 | 21.0 |

EXAMPLES 13 to 20

The procedure for Example 1 is repeated using a Shell Chemical Co. "EPON 828"-isocyanate mixture. Examples 17 to 20 are a double spray using lignin as a first spray. The binder level for Examples 13 to 16 is held constant at 3.5 percent based on 100 parts by weight of the oven dried wood. Examples 17 to 20 includes various weight percent lignin based on 100 percent by weight of oven dried wood as a first spray with varying PMDI-"EPON 828" second spray levels. The liquid diphenylmethane diisocyanate-polymethylene polyphenyl isocyanate (PMDI) mixture having 46.5 percent diphenylmethane diisocyanate content and "EPON 828" percentages are varied according to Table 3 below giving test results.

TABLE 3

| Ex. No. | PMDI (%) | "EPON 828" (%) | Lignin (Wt. %) | Binder Level (Wt. %) | I.B. (psi) | T.S. (%) |
|---|---|---|---|---|---|---|
| 13 | 90 | 10 | 0.0 | 3.5 | 163 | 20.1 |
| 14 | 50 | 50 | 0.0 | 3.5 | 127 | 25.3 |
| 15 | 58 | 42 | 0.0 | 3.5 | 134 | 24.9 |
| 16 | 30 | 70 | 0.0 | 3.5 | 81 | 30.2 |
| 17 | 70 | 30 | .32 | 3.08 | 137 | 21.4 |
| 18 | 70 | 30 | .64 | 2.79 | 116 | 23.9 |
| 19 | 70 | 30 | 1.08 | 2.48 | 107 | 24.1 |
| 20 | 70 | 30 | 1.4 | 2.09 | 90 | 27.7 |

EXAMPLE 21 (Comparative)

The procedure of Example 1 is repeated except that a phenol-formaldehyde resin (6%) is used as the binder. The pressing time used is 9 minutes with the pressing temperature 220° C. Test results below indicated that a wax must be added to that material pressed to give desired properties.

| I.B. (psi) | T.S. (%) |
|---|---|
| 100 | 33.1 |

EXAMPLES 22-25

The process for examples 13-20 is repeated using propylene carbonate (P.C.) as a extender/diluent for the Shell Chemical Company "Epox 828"-isocyanate binder mixture. Examples 24 and 25 are a double spray using lignin as a first spray based on the oven dried weight of wood. The total binder level is held constant at 3.4 percent based on 100 parts by weight of oven dried wood. The liquid diphenylmethane diisocyanate-polymethylene poly phenyl isocyanate (PMDI) mixture having 46.5 percent diphenylmethane diisocyanate content, "Epon 828" and propylene carbonate percentages are varied according to Table 4 below giving test results

TABLE 4

| Ex. No. | PMDI (%) | P.C. (%) | "EPON" 828 (%) | Lignin (Wt. %) | Binder Level (Wt. %) | I.B. (psi) | T.S. (%) |
|---|---|---|---|---|---|---|---|
| 22 | ·80 | 10 | 10 | 0.0 | 3.5 | 165 | 19.8 |
| 23 | 60 | 20 | 20 | 0.0 | 3.5 | 140 | 21.2 |
| 24 | 80 | 10 | 10 | 0.18 | 3.32 | 135 | 22.0 |
| 25 | 80 | 10 | 10 | 0.70 | 2.80 | 130 | 24.9 |

We claim:

1. An adhesive binder composition for the preparation of compression moldable lignocellulosic articles which comprises from about 20 to 95 percent by weight of an organic di- or polyisocyanate, from about 5 to 80 percent by weight of a liquid epoxide selected from liquid aromatic epoxides having one α epoxide group and aromatic or aliphatic based multifunctional epoxides having 2 or more α epoxide groups and between about 1.0 and 60 weight percent lignin based on the total composition as a diluent.

2. The adhesive composition of claim 1 wherein between 10 and 35 weight percent lignin is added as diluent.

3. The adhesive composition of claim 1 wherein the aromatic epoxide having one α epoxide group is styrene oxide.

4. The adhesive composition of claim 1 wherein the multifunctional epoxide is a diglycidyl ether of Bisphenol A.

5. The adhesive composition of claim 1 wherein the multifunctional epoxide is 3,4-epoxycyclohexylmethyl-3,4-epoxycyclohexane carboxylate.

6. The adhesive composition of claim 1 wherein the multifunctional epoxide is epoxidized p-aminophenol.

7. The adhesive composition of claim 1 wherein the di- or polyisocyanate is a diphenylmethane diisocyanate.

8. The adhesive composition of claim 1 wherein the di- or polyisocyanate is a mixture of diphenylmethane diisocyanate and the higher functionality polymethylene polyphenyl isocyanate.

9. The adhesive composition of claim 1 wherein from 50 to 75 weight percent organic di- or polyisocyanate, from 50 to 25 weight percent liquid epoxide and from 10 to 20 weight percent lignin based on the total composition is employed.

10. A compression moldable lignocellulosic composition comprising lignocellulosic particles and from about 1.5 to 12 percent by weight based on oven dried particles of an adhesive binder composition which comprises from about 20 to 95 weight percent organic di- or polyisocyanate, from about 5 to 80 weight percent liquid epoxide selected from liquid monomeric epoxides having one α epoxide group and aromatic or aliphatic based multifunctional epoxides having 2 or more α epoxide groups and between about 1.0 and 60 weight percent lignin based on the total composition as a diluent.

11. The compression moldable composition of claim 10 wherein 2.5 to 6.5 weight percent adhesive binder is employed in the composition.

12. The compression moldable composition of claim 10 wherein the lignin is between 10 and 35 weight percent.

13. The compression moldable composition of claim 10 wherein the aromatic epoxide having one α epoxide group is styrene oxide.

14. The compression moldable composition of claim 10 wherein the multifunctional epoxide is a diglycidyl ether of Bisphenol A.

15. The compression moldable composition of claim 10 wherein the multifunctional epoxide is 3,4-epoxycyclohexylmethyl-3,4-epoxycyclohexane carboxylate.

16. The compression moldable composition of claim 10 wherein the multifunctional epoxide is epoxidized p-aminophenol.

17. The compression moldable composition of claim 10 wherein from 50 to 75 weight percent organic di- or polyisocyanate and from 50 to 25 weight percent liquid epoxide is employed in the adhesive binder.

18. The compression moldable composition of claim 10 wherein the di- or polyisocyanate is a diphenylmethane diisocyanate.

19. The compression moldable composition of claim 10 wherein the di- or polyisocyanate is a mixture of diphenylmethane diisocyanate and the higher functionality polymethylene polphenyl isocyanates.

20. A composition board product comprising a compression molded lignocellulosic composition comprising lignocellulosic particles and from about 1.5 to 12 weight percent based on oven dried lignocellulosic particles employed of an adhesive binder composition, said binder composition being a mixture of from about 20 to 95 weight percent organic di- or polyisocyanate, from 5 to 80 weight percent liquid epoxide selected from liquid aromatic epoxides having one α epoxide group and aromatic or aliphatic based multifunctional epoxides having 2 or more epoxide groups and between about 1.0 and 60 weight percent lignin based on the total composition as diluent.

21. The board product of claim 20 wherein the compression molded lignocellulosic composition is wood particle board.

22. A method for the preparation of lignocellulosic composite articles comprising the steps of (a) mixing together lignocellulosic particles and from about 1.5 to 12 weight percent based on oven dried lignocellulosic particles of an adhesive binder composition comprising from 20 to 95 weight percent organic di- and polyisocyanate, from about 5 to 80 weight percent liquid epoxide selected from liquid aromatic epoxides having one α epoxide group and aromatic or aliphatic based multifunctional epoxides having 2 or more epoxide groups and between about 1.0 and 60 weight percent lignin based on the total composition as diluent to form a moldable composition;

(b) introducing said moldable composition onto a metal mold, caul plate or platen which has been sprayed or coated with a release agent;

(c) compression shaping said composition at temperatures of between about 140° C. to 220° C. at pressures of from about 100 to 600 psi for a period of from about 1 to 10 minutes to form a composite article of desired shape and/or thickness; and (d) thereafter releasing said lignocellulosic composite article from said metal mold, caul plate or platen.

23. A method according to claim 22 wherein 2.5 to 6.5 weight percent adhesive binder composition is employed and comprises from 50 to 75 weight percent organic di- or polyisocyanates, from 50 to 25 weight percent liquid epoxide and from 10 to 35 weight percent lignin, the release agent is a metallic soap, the compression temperature is between 160° C. to 190° C. and the time period is from 3 to 5 minutes.

24. A method according to claim 22 wherein the binder composition is a mixture of diphenylmethane diisocyanate and the higher functionality polymethylene polyphenyl isocyanates, diglycidyl ether of Bisphenol A and lignin.

25. A method according to claim 22 wherein the compression molded lignocellulosic composition is wood particle board.

* * * * *